(12) United States Patent
Scanlan

(10) Patent No.: US 6,488,732 B2
(45) Date of Patent: Dec. 3, 2002

(54) PLANT GROWTH MEDIUM

(76) Inventor: Joseph Scanlan, 580 Henry St., Brooklyn, NY (US) 11231

( * ) Notice: Subject to any disclaimer, the term of this patent is extended or adjusted under 35 U.S.C. 154(b) by 39 days.

(21) Appl. No.: 09/852,468

(22) Filed: May 9, 2001

(65) Prior Publication Data

US 2002/0069686 A1 Jun. 13, 2002

Related U.S. Application Data

(60) Provisional application No. 60/202,936, filed on May 9, 2000.

(51) Int. Cl.⁷ .............................. C05F 11/08; C05F 11/02
(52) U.S. Cl. .................... 71/8; 71/16; 71/17; 71/19; 71/23; 71/25; 71/63; 71/11; 71/10
(58) Field of Search .................................. 71/11, 16, 17, 71/19, 23, 25, 63, 8, 10

(56) References Cited

U.S. PATENT DOCUMENTS

| | | | |
|---|---|---|---|
| 2,951,755 A | * 9/1960 | Joffe | 71/6 |
| 3,640,696 A | * 2/1972 | Goldmann | 71/9 |
| 4,050,917 A | 9/1977 | Varro | 71/9 |
| 4,146,382 A | 3/1979 | Pinckard | 71/79 |
| 4,164,405 A | 8/1979 | Willisch | 71/9 |
| 4,369,054 A | 1/1983 | Shinholster, Jr. et al. | 71/25 |
| 5,021,247 A | * 6/1991 | Moore | 426/69 |
| 5,158,594 A | 10/1992 | Oxford | 71/25 |
| 5,192,354 A | 3/1993 | Drysdale et al. | 71/9 |
| 5,728,192 A | 3/1998 | Andrew, Jr. | 71/26 |

FOREIGN PATENT DOCUMENTS

| JP | 05 058767 | * 3/1993 | |
|---|---|---|---|

* cited by examiner

Primary Examiner—Chhaya D. Sayala
(74) Attorney, Agent, or Firm—Peter S. Canelias

(57) ABSTRACT

A material composed primarily of coffee grounds, along with other commercial and industrial waste materials, in which the materials are uniformly pulverized, skillfully measured and combined to form a homogeneous particulate waste mixture. The composition is alternately turned and rested in a windrow or like apparatus for several months until natural aerobic thermophilic fermentation causes the material composition to have an overall pH level of 5.0 to 7.0 (with an optimum of 6.0), for the purpose of making the minerals latent in the material composition soluble, conducive to healthy plant life, and therefore useable as a plant growth medium.

21 Claims, No Drawings

PLANT GROWTH MEDIUM

This application claims priority to U.S. provisional application No. 60/202,936, filed May 9, 2000, which is relied on and included herein by reference.

FIELD OF THE INVENTION

The present invention is a material composition related to manufactured potting soils and growth mediums. The invention is a growth medium produced from commercial and industrial waste materials, primarily coffee grounds, whose nutritional value to plants is equal or superior to extant commercial potting soils or naturally occurring top soils.

DESCRIPTION OF THE RELATED ART

Composting or otherwise recycling waste materials are disclosed in various patents. Willisch (U.S. Pat. No. 4,146,382), discloses a method and apparatus for composting refuse and sewage sludge. Varro (U.S. Pat. No. 4,050,917) discloses a method of composting waste by controlling aeration, pH, moisture content, and temperature during composting. Shinholster (U.S. Pat. No. 4,369,054) discloses a composition of pulped fibers and slag. Drysdale, et al (U.S. Pat. No. 5,192,354) discloses a soil substitute made by composting shredded treebark with quary stone particles and silica sand particles. Pinckard (U.S. Pat. No. 4,164,405) discloses a method for controlling fungi that utilizes aerobically fermented cotton gin waste produced under particular conditions.

Commercially, coffee grounds are produced by any and all retail establishments who brew and serve coffee. The scale of this waste production is difficult to track, as it is extremely scattered and diverse, but statistics compiled by the National Coffee Association indicate that coffee consumption produces 20 billion pounds of coffee grounds per year. Industrially, coffee grounds are produced on a massive scale through various food production processes, such as the making of coffee-flavored candies, ice creams and beverages. The vast majority of these coffee grounds are indiscriminately mixed with other waste materials, discarded, and inevitably landfilled. Once so corrupted, their use value is lost. A very small percentage of coffee grounds are donated to community gardens, municipalities, or nonprofit environmental groups, all of whom combine the material with other organic wastes for the purpose of composting it into useable soil amendments and ground covers.

Coffee grounds have been used as a plant fertilizer, particularly for plants that prefer a higher acid content in their soil, such as roses, azaleas, rhododendrons, tomatoes, and evergreens. However, such random mixing and composting does provide a sufficient methodology for providing a plant growth medium that allows the most advantageous absorption of coffee grounds' latent nutrients.

It would be advantageous, therefore, if coffee grounds could be mixed with other components in the proper quantities to capitalize on coffee grounds' latent nutrients (most notably nitrogen, potassium and phosphorus, the three most critical elements to healthy plant life) so that the grounds could become more useful to plants, which is not often the case with crude methods of adding coffee grounds to soil or compost. Moreover, the bulk of coffee grounds produced annually in the United States remains vastly underutilized, so it would be commercially advantageous to prepare a plant growth medium from such coffee grounds.

It also would be economically and environmentally advantageous to find practical applications for many other commercial and industrial byproducts that formerly have been underutilized if not discarded.

SUMMARY OF THE INVENTION

In one embodiment, a material produced from composting components is provided which comprises by weight from about 55 to 85% coffee grounds, from about 2 to 20% gypsum (calcium sulfate), from about 2 to 25% wood fines (preferably untreated sawdust, bark fines, and waste portions of woody plants), from about 0.5 to 5% bone meal and/or fish meal, from about 0.5 to 5% of blood meal or about 0.2 to 2% ammonium sulfate, and from about 0.05 to 0.15% magnesium sulfate (Epsom salts). Preferably, each of the components are pulverized, measured, and then mixed to form a homogeneous mixture. The pH of the material is preferably about 5.0 to 7, and reached this pH when the material is fully fermented.

Another embodiment includes from about 55 to 80% coffee grounds, from about 10 to 20% gypsum (calcium sulfate), and from about 5 to 15% wood fines. In another embodiment, the material comprises from about 55 to 75% coffee grounds, from about 2 to 10% gypsum (calcium sulfate), and from about 10 to 25% wood fines. Each of the components are pulverized, measured, and then mixed to form a homogeneous mixture; wherein the pH level of the material is about 5.0 to 7; and wherein the material is fully fermented.

The invention is also directed to a method comprising mixing the components and fermenting the mixture to form a mixture having a pH level of about 5.0 to 7.0. Preferably the components should be pulverized and measured before mixing and to form a homogeneous mixture.

In a preferred embodiment comprising composted coffee grounds, gypsum (calcium sulfate), wood fines, bone meal and/or fish meal, a nitrogen-providing substance, and magnesium sulfate (Epsom salts), the material contains about 100–199 ppm nitrogen, about 20–200 ppm phosphorus, about 80–500 ppm potassium, about 25–300 ppm calcium, about 10–200 ppm magnesium, about 20–200 ppm sulfur, and more preferably at least one element selected from the group consisting of boron, iron, manganese, zinc, and copper in the following preferred amounts: 0.1–2.5 ppm boron, about 15–40 ppm iron, about 2–40 ppm manganese, about 5–30 ppm zinc, and about 2–30 ppm copper.

In an alternative embodiment, a material of the invention produced from composting components comprises by weight about 55 to 85% coffee grounds, about 0.5 to 5% of a nitrogen-providing substance, about 2 to 20% of a calcium-providing substance, about 0.05 to 0.15% of a magnesium-providing substance, about 0.5 to 5% of a phosphorous-providing substance, and about 2 to 25% of a composting accelerator. Preferably, this medium contains about 100–199 ppm nitrogen, about 20–200 ppm phosphorus, about 80–500 ppm potassium, about 25–300 ppm calcium, about 10–200 ppm magnesium, about 20–200 ppm sulfur, and more preferably about 0.1–2.5 ppm boron, about 15–40 ppm iron, about 2–40 ppm manganese, about 5–30 ppm zinc, and about 2–30 ppm copper. A preferred method of making a plant growth medium comprises providing the nitrogen-providing substance, the calcium-providing substance, the magnesium-providing substance, the phosphorous-providing substance, and the composting accelerator, and composting the mixture with coffee grounds to form the plant growth medium.

These embodiments are described below in more detail.

DETAILED DESCRIPTION OF THE INVENTION AND PREFERRED EMBODIMENTS THEREOF

In its broadest concept, the present invention includes a material composition comprised of the combination of the following materials (a) through (f):

a) Coffee grounds. Coffee grounds are defined as the processed residue that remains from any of the beans of the genus Coffea, especially *C. arabica* and *C. canephora,* that are harvested and roasted for consumption. Consumption most commonly entails grinding the roasted coffee beans into fine particles, measuring the particles into a finer mesh filtration device, and then passing hot water through the device so as to leach color and flavor from the ground roasted coffee bean particles for the purpose of making a liquid. The liquid is then either consumed as a beverage, partially dehydrated and used as an extract in processed foods, or fully dehydrated and used as an ingredient in processed foods. After water has passed through the ground roasted coffee bean particles and the desired attributes have been leached from them, the gritty, aqueous sludge that remains in the body of the filtration device is known as coffee grounds. Although the amount of water in coffee grounds varies depending on the length of time they drain after the filtering process, or the amount of time water from the coffee grounds has been evaporated therefrom, coffee grounds are generally about 25–60% water by weight, and can be 25–35%, 35–45%, 45–55%, or 55–60% by weight water.

b) A primary calcium-providing substance such as calcium sulfate. Calcium sulfate, generally known as gypsum, phospho-gypsum or phosphate rock, is a naturally occurring mineral deposit mined and used in the manufacture of various construction materials including wallboard, joint compound, plaster of paris and Portland cement. Phosphate rock is also used in the manufacture of phosphoric acid, a process in which sulfuric acid is slurried with phosphate rock with the primary byproduct being phospho-gypsum, which can be converted into a nitrogen-phosphorous-potassium-sulfur fertilizer as claimed in Oxford (U.S. Pat. No. 5,158,594). Since 1990, gypsum has also been produced by enforcement of Title IV of the Federal Clean Air Act, which mandates that all U.S. coal burning power plants slurry their coal smoke emissions with limestone in mechanisms known as scrubbers for the purpose of reducing the amount of sulfur dioxide particles coal burning power plants emit into the air. Gypsum is the primary byproduct of this scrubbing process. The present invention is in part designed toward, but not limited to, the exploitation of gypsum surpluses created by enforcement of Title IV of the Federal Clean Air Act, as this gypsum is generally not pure enough for use by the construction materials industry but wholly sufficient for use as a component of organic composting and the production of plant growth mediums.

c) A primary composting accelerator such as wood fines. Preferably, the composting accelerator is an organic matter that is broken down by microorganisms and are used as fuel to propagate the microorganisms such as bacteria. Such an accelerating substance, therefore, promotes the breakdown of the other materials in the composition. Wood fines are byproducts of the wood processing industries, chiefly lumber milling, construction, landscaping and woodworking, all of which generate excess woody matter in the form of barks, branches, leaves, stumps, chips, turnings, shavings, scraps and saw dust. A composting accelerator such as wood fines are relevant to the present invention as a carbon source for microorganisms, and thus as the primary material in aerobic thermophilic fermentation.

d) A primary phosphorous-providing substance such as bone meal and/or fish meal. Bone meal and/or fish meal are the byproducts of the livestock, fish and animal processing industries. Slaughterhouses, fisheries and rendering plants all produce bones and skeletal matter as a byproduct of meat and fish food production, animal feed production, and the use of animal parts in the manufacture of gelatins, adhesives, cosmetics and the like. Bone meal and/or fish meal are collected, steam sterilized, dehydrated, ground into uniform particles, and are rich in phosphorus, potassium, magnesium and zinc.

e) A primary nitrogen-providing substance, such as blood meal or ammonium sulfate. Blood meal is also a byproduct of the animal processing industries, the result of many of the same processes as bone and/or fish meal, and subjected to similar processing methods and regulations as bone and/or fish meal. Blood meal is rich in nitrogen, iron and magnesium. Ammonium sulfate can also be used as a nitrogen-providing substance. If ammonium sulfate is used, an additional source of iron and/or magnesium may be added.

f) A primary magnesium-providing substance such as magnesium sulfate (Epsom salts). Epsom salts are a naturally occurring mineral deposit that is mined, washed, pulverized into uniform particles and packaged primarily for use as an ameliorative medicinal product. It can be dissolved in fall body baths as a soaking agent for minor orthopedic and muscular aches; dissolved in water and applied as a compress to minor sprains and bruises; or dissolved in water and ingested for use as a mild laxative. Although not packaged or marketed as a gardening supply, Epsom salts are a natural, water-soluble source of magnesium, sulfur and boron.

Although some of the components described above (e.g. nitrogen and phosphorous) is found in coffee grounds, components b)–f) refer to components other than coffee grounds which are primary sources for each component listed. Substances used to provide the nutrients in the invention also include amounts of important nutrients namely potassium and sulfur and are provided with e.g., the phosphorous-providing substance such as bone meal and/or fish meal and the magnesium-providing substance such as magnesium sulfate (Epsom salts) respectively.

In a preferred embodiment, a method of the present invention comprises reducing any of the above defined waste materials (a) through (f) which are not in particulate form to uniform particles via a hammer mill or like apparatus; measuring these uniform particles by weight and then mixing them to form a homogeneous (uniformly mixed) particulate waste mixture; alternately turning and resting the composite mixture in a windrow or like apparatus over a period of several months until naturally occurring aerobic thermophilic fermentation causes the material composition to arrive at a pH level of 5.0 to 7.0.

This material composition and method is invented for the purpose of making the material composition's latent nutrients and minerals (nitrogen, phosphorus, potassium, calcium, magnesium, sulfur, and in addition, more preferably, boron, iron, manganese, zinc and copper) become soluble and conducive to healthy plant life, and therefore making the material composition useable as a plant growth medium. It has been discovered that the present invention is conducive to healthy plant life.

In one embodiment, eight chemical criteria, namely pH, nitrogen, potassium, phosphorus, calcium, magnesium, sulfur, and conductivity levels, are present in the following preferred ranges, which are preferably determined by saturated media extract tests. The pH of the composted material is preferably about 5.0–7.0, and more preferably about 5.5–6.5, and most preferably about 5.8–6.1. Conductivity is preferably about 2.0–3.5 mmho/cm, and more preferably about 2.5–3.0 mmho/cm, and most preferably about 2.6–2.7. Nitrogen is present preferably in the range from about 100–199 ppm, more preferably from about 100–150 ppm or 110–125 ppm, and most preferably about 105–115 ppm. Phosphorus is present preferably in the range from about 20–200 ppm, more preferably from about 50–150 ppm, and most preferably about 60–90 ppm. Potassium is present preferably in the range from about 80–500 ppm, more preferably from about 100–300 ppm, and most preferably about 150–250 ppm. Calcium is present preferably in the range from about 25–300 ppm, more preferably from about 40–225 ppm, and most preferably about 50–200 ppm. Magnesium is present preferably in the range from about 10–200 ppm, more preferably from about 15–175 ppm, and most preferably about 20–150 ppm. Sulfur is present preferably in the range from about 20–200 ppm, more preferably about 20–100 ppm, and most preferably about 60–75 ppm.

In a preferred embodiment, the material of the present invention contains the following levels of each of five additional chemical criteria, in addition to the levels described above for pH, nitrogen, potassium, phosphorus, calcium, magnesium, sulfur, and conductivity levels. Boron is present preferably in the range from about 0.1–2.5 ppm, more preferably from about 0.25–2.25 ppm, and most preferably about 0.5–2.0 ppm. Iron is present preferably in the range from about 15–40 ppm, more preferably about 15–25 ppm, and most preferably about 15–17 ppm. Manganese is present preferably in the range from about 2–40 ppm, more preferably from about 4–35 ppm, and most preferably about 5–30 ppm. Zinc is present preferably in the range from about 5–30 ppm, more preferably about 5–20 ppm or 10–17 ppm, and most preferably about 15.5 ppm. Copper is present preferably in the range from about 2–30 ppm, more preferably about 2–10 ppm or 2–5 ppm, and most preferably 2.9 ppm.

It has been discovered that the material composition of the present invention is not only conducive to healthy plant life, but composting that preferably includes aerobic thermophilic fermentation applied to the material composition, composed primarily of coffee grounds, is conducive to microorganisms that are a deterrent to plant and soil-born diseases, insects and pathogens. Heterotrophic bacteria play a role in cycling nutrients and suppressing plant diseases; anaerobic bacteria play a role in cycling nutrients; yeasts and molds play a role in breaking down organic compounds and stabilizing soil aggregates; actinomycetes play a role in cycling complex chemical substances such as chitin and cellulose and assist in reducing plant pathogens; and pseudomonads play a role in nutrient cycling and promoting phosphorus availability.

It has been discovered that a random or otherwise unskilled addition of coffee grounds to top soil or bio mass composting piles does not result in a growth medium having the advantages of the present invention. In fact, coffee grounds applied directly to garden soil or the roots of plants can distract microorganisms away from their nutrient cycling roles as well as diminish available nitrogen levels in the soil, both of which are detrimental to healthy plant growth.

The unskilled combination of the waste materials that comprise the present invention, for example coffee grounds, calcium sulfate (gypsum), wood fines (preferably untreated sawdust, bark fines, and/or waste portions of woody plants), bone meal and/or fish meal, blood meal, and magnesium sulfate (Epsom salts), and/or the unskilled method of measuring, pulverizing, mixing, and composting the combined materials, which according to the invention takes place until natural aerobic thermophilic fermentation causes the material composition to have an overall pH level of 5.0 to 7.0, will result in a material composition that does not have the advantages of the present invention. Too high a concentration of coffee grounds will result in a material composition that is nitrogen deficient, hyperconductive, and/or low in actinomycete bacteria, as well as be too acidic for the material composition's latent nutrients to be adequately absorbed by plant life. Inversely, too low a concentration of coffee grounds will result in a material composition that is too alkaline for sufficient aerobic thermophilic fermentation to take place and for the mixture's latent materials to be conducted. Further, disproportionate amounts of calcium sulfate (gypsum), wood fines (preferably untreated sawdust, bark fines, and/or waste portions of woody plants), bone meal and/or fish meal, blood meal, and magnesium sulfate (Epsom salts) in the material composition will inhibit aerobic thermophilic fermentation, thereby diminishing the ability of microorganisms to do their work and thereby producing an imbalanced and insufficient plant growth medium.

In a preferred embodiment, the skillful combination of the present invention's material composition of coffee grounds, calcium sulfate (gypsum), wood fines (preferably untreated sawdust, bark fines, and/or waste portions of woody plants), bone meal and/or fish meal, blood meal, and magnesium sulfate (Epsom salts), and the skillful execution of the present invention's aerobic thermophilic fermentation method, are required in order for the present invention to be fully manifested and for the horticultural benefits of coffee grounds as the primary component of a plant growth medium to be fully utilized. A fully fermented composition occurs when the composition of the invention stabilizes, that is, the bacterial production levels off, the mixture returns to room temperature and the pH level is within the preferred range to achieve an advantageous level of elemental components.

It has been recognized by Andrew, Jr. (U.S. Pat. No. 5,728,192) that heat is a useful temporary byproduct of aerobic thermophilic fermentation. In the present invention, the production of heat is relevant only to the extent that it evidences the existence of the thriving microorganisms identified above, and the benefits therewith to the production of a viable plant growth medium whose primary component is coffee grounds.

It has been recognized in Drysdale, et al (U.S. Pat. No. 5,192,354) and others, that one aspect of the art of composting is that the presence of moisture in the bio mass material is required in order for sufficient aerobic thermophilic fermentation to take place. It is also an aspect of the art that the production of heat, which can cause the core of the bio mass material to reach temperatures of 65° C. or more, also causes moisture to evaporate to the extent that additional water must be applied to the bio mass material in order to maintain adequate fermentation. While the present invention is not exempt from these requirements, the use of coffee grounds as the majority component (55 to 85%) of the overall bio mass material retards the need for additional water. Thus, the use of coffee grounds as the primary component in the material composition and method of the present invention is a further practical improvement on the prior art of composting for the purpose of producing soil amendments and plant growth mediums.

EXAMPLES

The following percentages (by weight) are preferred for use in the invention when standard coffee grounds are used for the purpose of making a plant growth medium having the advantages of the present invention.

Example I

The following materials are pulverized, measured and mixed to form a homogenous particulate water-containing mixture, and then composted until the pH reaches 5.0–7.0.

| | |
|---|---|
| coffee grounds | 55–85% |
| gypsum | 2–10 |
| wood fines | 2–10 |
| bone meal | 0.5–5 |
| blood meal | 0.5–5 |
| Epsom salts | 0.05–0.15 |

Example II

Using the method described in Example I, the percentage of gypsum is increased in the product of the invention for the purpose of exploiting increases in the supply of gypsum as a waste material, or for the purpose of increasing available nitrogen and calcium, or for the purpose of decreasing the overall acidity of the plant growth medium:

| | |
|---|---|
| coffee grounds | 55–80% |
| gypsum | 10–20 |
| wood fines | 5.0–15 |
| bone/fish meal | 0.5–5 |
| blood meal | 0.5–5 |
| Epsom salts | 0.05–0.15 |

Example III

Using the method described in Example I, the percentage of wood fines in the invention are increased for the purpose of increasing the overall acidity of the plant growth medium, or for the purpose of exploiting increases in the supply of wood fines as a waste material:

| | |
|---|---|
| coffee grounds | 55–75% |
| gypsum | 2–10 |
| wood fines | 10–25 |
| bone/fish meal | 0.5–5 |
| blood meal | 0.5–5 |
| Epsom salts | 0.05–0.15 |

Example IV

Substitution of Ammonium Sulfate for Blood Meal as a Nitrogen Source

Ammonium sulfate can be substituted for blood meal as a nitrogen source and integral component of the present invention, at about half the percentage to that of blood meal in any of the stated examples, with the remainder of the overall volume being accounted for through proportionate increases in the amounts of coffee grounds, gypsum, wood fines (preferably untreated sawdust, bark fines, and/or waste portions of woody plants), bone and/or fish meal, and Epsom salts.

Example V

Use of the Product of the Invention as a Soil Amendment for Lowering Soil pH

Lowering the pH levels in top soils and growth mediums is a common desire in both commercial and residential gardening. Acidic plant growth mediums are particularly valuable in urban settings, where most in ground gardening is done in plots contained by sidewalks, building foundations or retaining walls constructed of stone, brick and cement. Due to seasonal changes, precipitation, and natural material erosion, alkalies in the form of lime and calcium tend to leach out of these stone, brick and concrete structures and into topsoils, substrates and water tables, altering soil chemistry over time by raising its pH and making it neutral, if not alkaline. The product of the present invention is mixed with extant urban top soils, substrates and growth mediums to help to acidify the overall growth medium, lower its pH, and produce a more balanced and nutritional plant growth mediums.

Example VI

Nutrient Levels

Chemical analysis, namely saturated media extract tests, of the fermented material resulted in acceptable or greater nutrient levels in each of thirteen chemical criteria. On average, based on Examples I–III, the material's pH level was 5.9; conductivity was 2.65 mmho/cm; nitrogen was 110 ppm; phosphorus was 141 ppm; potassium was 491.3 ppm; calcium was 217 ppm, magnesium was 154 ppm; sulfur was 68 ppm; boron was 0.2 ppm; iron was 16 ppm; manganese was 30.2 ppm; zinc was 15.5 ppm; and copper was 2.9 ppm.

The invention in its broader aspects is not limited to the specific details outlined and described herein. Departures may be made from these details within the scope of the accompanying claims without departing from the principles of the invention.

I claim:

1. A composition for composting comprising by weight from about 55 to 85% coffee grounds, from about 2 to 20% gypsum (calcium sulfate), from about 2 to 25% wood fines, from about 0.5 to 5% bone meal and/or fish meal, from about 0.5 to 5% of blood meal or about 0.2 to 2% ammonium sulfate, and from about 0.05 to 0.15% magnesium sulfate (Epsom salts).

2. The composition of claim 1, wherein each of the components are pulverized, measured, and then mixed to form a homogeneous mixture.

3. The composition of claim 1, wherein the woody fines are at least one member selected from the group consisting of untreated sawdust, bark fines, and waste portions of woody plants.

4. The composition of claim 1, wherein the pH of the material is about 5.0 to 7.

5. The composition of claim 3, wherein the material is fully fermented.

6. The composition defined in claim 1 comprising by weight from about 55 to 80% coffee grounds, from about 10 to 20% gypsum (calcium sulfate), and from about 5 to 15% wood fines;

wherein each of the components are pulverized, measured, and then mixed to form a homogenous mixture;
wherein the pH level of the material is about 5.0 to 7% and
wherein the material is fully fermented.

7. The composition defined in claim 1 comprising from about 55 to 75% coffee grounds, from about 2 to 10% gypsum (calcium sulfate), and from about 10 to 25% wood fines;
wherein each of the components are pulverized, measured, and then mixed to form a homogenous mixture;
wherein the pH level of the material is about 5.0 to 7; and
wherein the material is fully fermented.

8. A method comprising
mixing the components defined in claim 1;
fermenting the mixture to form a mixture having a pH level of about 5.0 to 7.0.

9. The method defined in claim 8 further comprising
pulverizing and measuring the components before said mixing step and forming a homogeneous mixture.

10. The method defined in claim 8,
wherein the components comprise from about 55 to 80% coffee grounds, from about 10 to 20% gypsum (calcium sulfate), and from about 5 to 15% wood fines.

11. The method defined in claim 8,
wherein the components comprise form about 55 to 75% coffee grounds, from about 2 to 10% gypsum (calcium sulfate), and from about 10 to 25% wood fines.

12. A composition for composting comprising from about 55 to 75% coffee grounds, gypsum (calcium sulfate), wood fines, bone meal and/or fish meal, a nitrogen-providing substance, and magnesium sulfate (Epson salts), wherein the material contains about 100–199 ppm nitrogen, about 20–200 ppm phosphorus, about 80–500 ppm potassium, about 25–300 ppm calcium, about 10–200 ppm magnesium, and about 20–200 ppm sulfur.

13. The composition defined in claim 12, wherein the material further comprises at least one element selected from the group consisting of boron, iron, manganese, zinc, and copper.

14. The composition defined in claim 13, wherein the elements are found in the amount of about 0.1–2.5 ppm boron, about 15–40 ppm iron, about 2–40 ppm manganese, about 5–30 ppm zinc, and about 2–30 ppm copper.

15. The composition defined in claim 13, wherein the pH level of the material is about 5.0 to 7.

16. A composition for composting comprising by weight about 55 to 85% coffee grounds, about 0.5 to 5% of a nitrogen-providing substance, about 0.5 to 5% of a phosphorous-providing substance, and about 2 to 25% of a composting accelerator.

17. The composition defined in claim 16, wherein the medium contains about 100–199 ppm nitrogen, about 20–200 ppm phosphorus, about 80–500 ppm potassium, about 25–300 ppm calcium, about 10–200 ppm magnesium, about 20–200 ppm sulfur.

18. The composition defined in claim 17 wherein the medium further contains about 0.1–2.5 ppm boron, about 15–40 ppm iron, about 2–40 ppm manganese, about 5–30 ppm zinc, and about 2–30 ppm copper.

19. A method of making a plant growth medium comprising
providing the nitrogen-providing substance, the calcium-providing substance, the magnesium-providing substance, the phosphorous-providing substance, and the composting accelerator defined in claim 16, and
composting said mixture with coffee grounds to form the plant growth medium.

20. The method defined in claim 19 wherein the medium contains about 100–199 ppm nitrogen, about 20–200 ppm phosphorus, about 80–500 ppm potassium, about 25–300 ppm calcium, about 10–200 ppm magnesium, about 20–200 ppm sulfur.

21. The method defined in claim 20 wherein the medium further contains about 0.1–2.5 ppm boron, about 15–40 ppm iron, about 2–40 ppm manganese, about 5–30 ppm zinc, and about 2–30 ppm copper.

* * * * *